Dec. 17, 1968 H. WALZ 3,416,223

METHOD OF PRODUCING THERMOBATTERIES

Filed Oct. 24, 1965

United States Patent Office 3,416,223

Patented Dec. 17, 1968

3,416,223

METHOD OF PRODUCING THERMOBATTERIES

Heinz Walz, Erlangen, Germany, assignor to Siemens Aktiengesellschaft, Munich, Germany Filed Oct. 24, 1965, Ser. No. 504,399
Claims priority, application Germany, July 2, 1965, S 97,948
2 Claims. (Cl. 29—573)

ABSTRACT OF THE DISCLOSURE

Method of producing a thermobattery includes covering the base plate of the battery with an insulating layer formed of a foil of synthetic plastic containing glass fiber, coating the plastic foil on both sides with a polymerizable bonding agent, cementing the foil onto the base plate and to a thermobattery conductor plate respectively with the aid of a bonding agent, covering the conductor plate with photosensitive varnish, exposing the varnish to an illumination pattern corresponding to that formed by thermobattery contact members, and etching the conductor plate through the resulting varnish mask to convert it to the contact members pattern.

My invention relates to a method of producing a thermobattery having a metal plate provided on one side with an electrically insulating layer on which are placed contact pieces or contact bridges interconnecting the thermoelectrically active semiconductor legs of the battery.

According to a known method of this kind, a film of aluminum oxide is flame sprayed upon a metal plate, and the contact bridges for the semiconductor legs are thereafter deposited upon the oxide coating. The thermobatteries obtained with this method are not resistant to an atmosphere containing water vapor. The water vapor penetrates into the porous layer of aluminum oxide and renders it electrically conducting. Thus there occur spurious currents which render the battery of thermocouples defective or unsuitable for the intended purpose.

It is an object of my invention to devise a simple production method for thermocouple batteries of the above-mentioned type which assures obtaining permanent thermocouples as components of the resulting battery, so that the latter is not impaired by exposure to water vapor.

To this end, and in accordnace with my invention, I improve the introductorily mentioned method by first depositing an electrically insulating layer on top of the base plate, for example in the manner heretofore customary, and then cement a conductor plate of good conducting metal face-to-face upon the insulating layer. Thereafter I coat the conductor plate with photosensitive varnish and expose the varnish in accordance with a pattern of illumination corresponding to the desired pattern of contact-bridge arrangement. After eliminating the unexposed areas, the conductor plate is subjected to etching and thereby subdivided into the individual contact members or bridges. Thereafter the individual thermocouple legs are attached across the bridges in the conventional manner. To secure uniform etching of the conductor plate after exposure, it is preferable to apply the etching liquid by spraying it upon the plate.

The method of the invention will be further described with reference to a specific example and with reference to the accompanying drawing in which.

Figure 1:
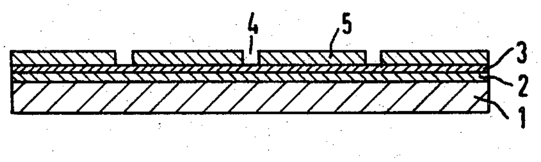
FIG. 1 shows in cross section an intermediate product of the method.
Figure 2:
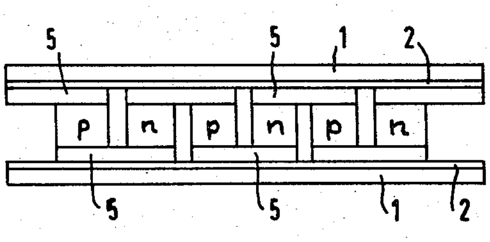
FIG. 2 is a lateral view of a finished thermobattery.

A base plate 1 of metal is first cleaned and roughened on one side by sandblasting. Thereafter a ceramic layer 2 of high thermal conductivity, preferably alumina ($Al_2O_3$), is sprayed onto the roughened side by means of a high-temperature spray gun or plasma gun. The resulting ceramic layer 2 is then coated with an adhesive 3, for example a heat polymerizable plastic cement, which may be brushed or sprayed onto the surface. Placed on top of the adhesive coating is a cleaned plate of conductor metal consisting preferably of copper. The resulting assembly is placed into an evacuated furnace and heated at 180° C. for about 30 minutes, thus hardening the plastic cement. Due to the vacuum in the furnace, any air bubbles will escape out of the plastic adhesive. After hardening and cooling of the assembly, the top surface of the conductor plate is ground to planar configuration and then coated, again by brushing or spraying with a photosensitive varnish such as those employed for photomasking and etching techniques in semiconductor manufacturing operations. The photosensitive varnish is illuminated through a negative film placed upon the assembly and exhibiting a desired pattern of the arrangement of contact bridges into which the conductor plate is to be subdivided. The unexposed areas of the photosensitive varnish, namely the interspaces 4 between the desired contact bridges 5, are thereafter washed away. These localities are subsequently etched by spraying etching liquid onto the top plate. Particularly well suitable as etching liquid is iron chloride or chromic acid for a conductor plate consisting of copper or aluminum. After etching, the assembly is washed and if necessary neutralized. Thereafter a number of alternately p-type conducting and n-type conducting thermocouple legs of semiconductor material are placed between two assemblies made in the above-described manner and are then soldered between the contact bridges of the respective plate assemblies. The end faces of the thermocouple legs are previously coated with solder to facilitate the joining operation. An example of a thermobattery thus produced is shown in FIG. 2 in which the thermocouple legs are denoted by *p* and *n*.

In the method according to the invention as exemplified above, as well as in the resulting products, the layer 3 of adhesive between the insulating layer 2 on the base plate and the conductor plate or the resulting contact members 5 serve not only to cement the conductor plate to the insulating layer but also seal any porosity of the insulating layer. This has the effect that the metallic base plate is protected by the insulating layer during the etching operation. Furthermore, any ingress of humidity into the insulating layer is permanently prevented. To secure these advantages, the adhesive must be resistant to the etching liquid as well as to the atmosphere in which the thermobattery is to be used. The adhesive should further have a good temperature stability at the hot contact localities of the thermobattery.

In comparison with the above-mentioned known production method, the invention imparts to the resulting products not only an improved stability relative to water-containing atmospheres, but also permits achieving a much better accuracy as to the spacial arrangement of the contact bridges. Consequently, the invention is particularly well suitable for the production of thermobatteries having contact bridges of small dimensions.

As mentioned, the electrical insulating layer on top of the base plate may consist of ceramic material such as alumina, and it is preferable to previously roughen the metal plate to secure a better adhesion of the ceramic layer. However, a foil of synthetic plastic which contains glass fibers is also well suitable as an electrically insulating layer for the purposes of the invention. In this case it is preferable to employ synthetic plastic foils coated on both sides with polymerizable plastic adhesive. Only a single step of operation then suffices to attach the foil to the base plate, to also attach the conductor plate to the foil, and to simultaneously harden the adhesive between the two metal plates and the insulating intermediate layer. Suitable as plastic adhesive, for example, is a single-component adhesive obtainable under the trade designation AV 8 from Ciba, Basel, Switzerland. The above-mentioned photosensitive varnish is commercially available as photoresist varnish, for example, from Eastman Kodak, Rochester, N.Y.

I claim:

1. In the production of a thermobattery having a base plate with an electrically insulating surface layer, mutually spaced contact members on the layer, and thermoelectric legs on the contact members and serially interconnected thereby, the method which comprises the steps of coating with a polymerizable bonding agent both sides of a foil comprised of synthetic plastic containing glass fiber, covering the base plate with an insulating layer formed of said coated foil, cementing the foil onto the base plate and to the conductor plate respectively with the aid of the bonding agent, covering the conductor plate with photosensitive varnish, exposing the varnish coat to an illumination pattern corresponding to the pattern to be formed by the contact members, and then etching the conductor plate through the resulting varnish mask to convert it to said pattern of contact members.

2. The thermobattery production method according to claim 1, which comprises spraying etchant liquid upon said varnish-masked conductor plate to obtain said contact members.

References Cited

UNITED STATES PATENTS

| | | | |
|---|---|---|---|
| 2,981,877 | 4/1961 | Noyce. | |
| 3,088,989 | 5/1963 | Lipkis | 29—573 X |
| 3,170,813 | 2/1965 | Duncan et al. | |
| 3,247,578 | 4/1966 | Jaremus et al. | 29—573 |
| 3,261,079 | 7/1966 | Clingman et al. | 29—573 |

FOREIGN PATENTS

| | | |
|---|---|---|
| 1,159,533 | 12/1963 | Germany. |

WILLIAM I. BROOKS, *Primary Examiner.*

U.S. Cl. X.R.

156—3; 136—203